US006431042B1

(12) United States Patent
Brault et al.

(10) Patent No.: US 6,431,042 B1
(45) Date of Patent: Aug. 13, 2002

(54) TURNTABLE MECHANISM FOR A CUTTING TOOL

(75) Inventors: Richard P. Brault, Cedarburg; Jeffrey S. Holly, Menomonee Falls, both of WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 08/919,866

(22) Filed: Aug. 28, 1997

Related U.S. Application Data

(63) Continuation of application No. 08/663,797, filed on Jun. 14, 1996, now abandoned, which is a continuation of application No. 08/242,182, filed on May 13, 1994, now abandoned.

(51) Int. Cl.$^7$ .......................... B27B 5/18; B23D 45/04; B26D 7/26
(52) U.S. Cl. ................. 83/471.3; 83/477.2; 83/522.18; 83/522.25; 83/698.31
(58) Field of Search ................................ 83/471.3, 490, 83/474, 477.2, 522.18, 522.25, 581, 698.31, 471; 384/620, 623; 403/393, 386; 24/324, 662, 297

(56) References Cited

U.S. PATENT DOCUMENTS

| 3,289,713 A | * | 12/1966 | Herzog ...................... 83/477.2 |
| 3,821,918 A | * | 7/1974 | Niehaus et al. ............. 83/471.3 |
| 3,971,274 A | * | 7/1976 | Barton ....................... 83/471.3 |
| 3,998,121 A | | 12/1976 | Bennett ...................... 83/471.3 |
| 4,559,857 A | | 12/1985 | Grossmann et al. ........ 83/471.3 |
| 4,603,614 A | * | 8/1986 | Charonnat .................... 83/577 |
| 4,638,700 A | | 1/1987 | Fushiya et al. ............... 83/467 |
| 4,774,866 A | | 10/1988 | Dehari et al. ................. 83/478 |
| 4,793,031 A | * | 12/1988 | Kasai .......................... 24/324 |
| 4,869,142 A | | 9/1989 | Sato et al. ................. 83/467.1 |
| 4,934,233 A | | 6/1990 | Brundage et al. ............. 83/397 |
| 4,981,373 A | * | 1/1991 | Bando ......................... 384/620 |
| 5,020,406 A | | 6/1991 | Sasaki et al. ................. 83/397 |
| 5,042,348 A | | 8/1991 | Brundage et al. .......... 83/471.3 |
| 5,054,352 A | | 10/1991 | Fushiya et al. ............ 83/468.3 |
| 5,060,548 A | | 10/1991 | Sato et al. ............. 83/471.003 |
| 5,202,172 A | * | 4/1993 | Graf ............................ 24/297 |
| 5,220,712 A | * | 6/1993 | Taki et al. .................... 24/662 |
| 5,249,496 A | * | 10/1993 | Hirsch et al. ................. 83/490 |
| 5,392,678 A | * | 2/1995 | Sasaki et al. ............. 83/473 X |

* cited by examiner

Primary Examiner—Charles Goodman
(74) Attorney, Agent, or Firm—Michael Best & Friedrich LLP

(57) ABSTRACT

A cutting tool including a base having a workpiece support surface for supporting a workpiece and an annular, upwardly facing bearing surface. The cutting tool also includes a turntable mounted on the base for rotation about a generally vertical axis. The turntable has a workpiece support surface and an annular, downwardly facing bearing surface. A cutting unit is mounted on the turntable for movement therewith and an annular bearing is mounted between the first and second bearing surfaces. The cutting unit also includes a biasing mechanism for biasing the second surface toward the first surface so that the base workpiece support surface and the turntable workpiece support surface form a smooth continuous upper surface beneath the cutting unit.

19 Claims, 6 Drawing Sheets

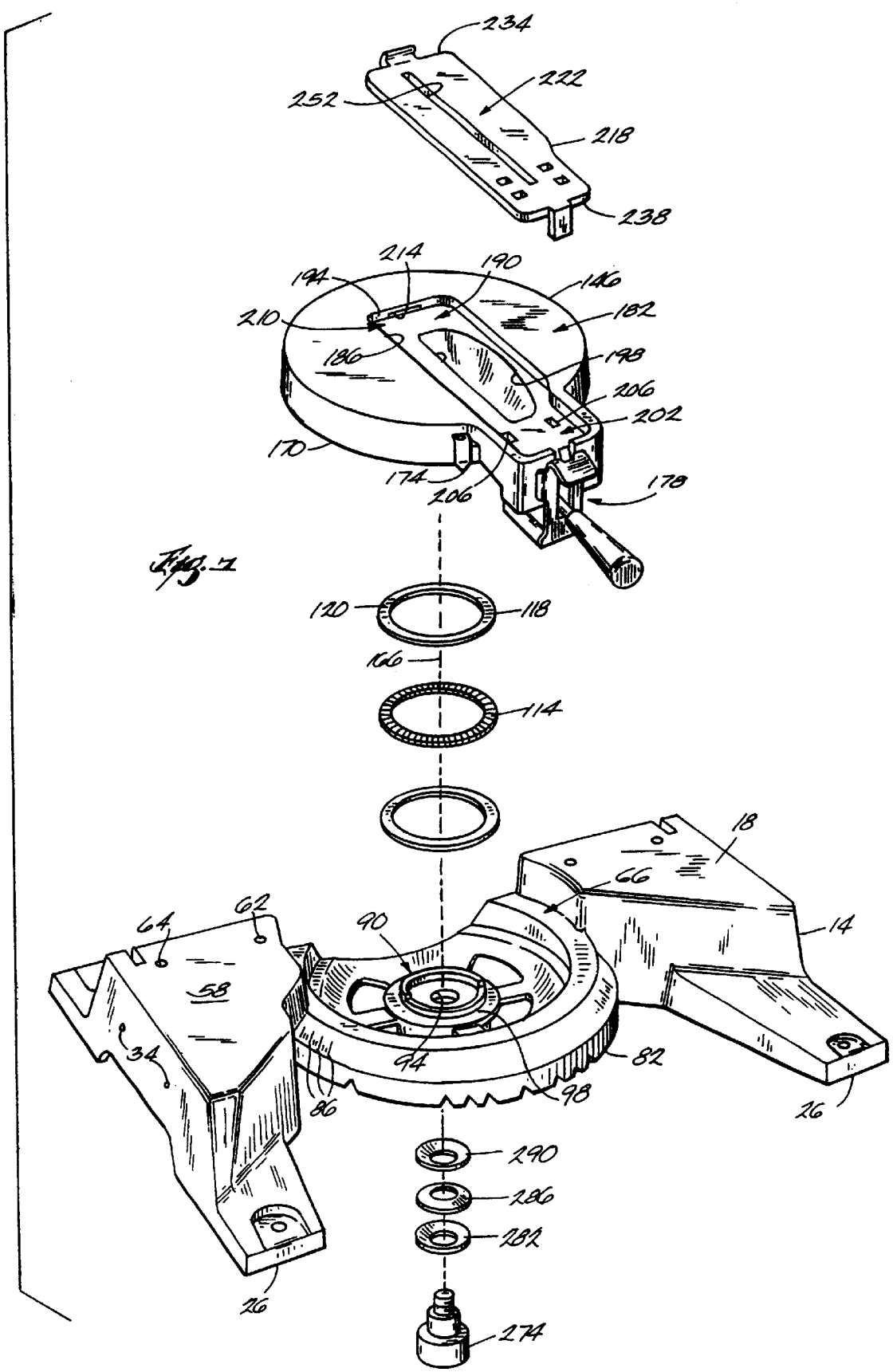

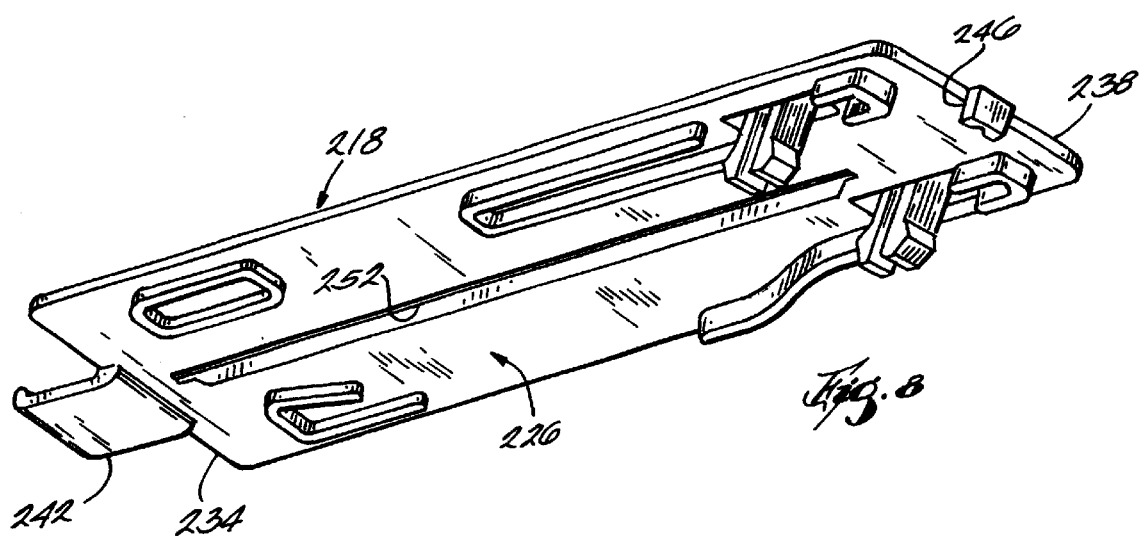
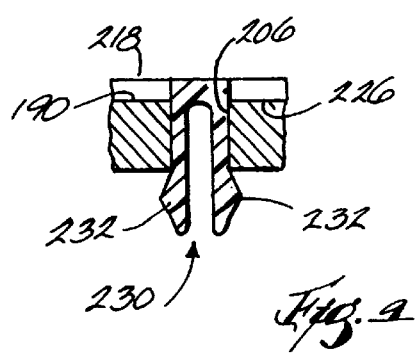

TURNTABLE MECHANISM FOR A CUTTING TOOL

"This is a continuation of application Ser. No. 08/663,797, filed Jun. 14, 1996, now abandoned, which is a continuation of application Ser. No. 08/242,182, filed May 13, 1994, now abandoned."

BACKGROUND OF THE INVENTION

The invention relates to a miter saw and in particular to a bearing arrangement for supporting a turntable on the base of a miter saw.

Miter saws, typically include a base having a support surface for supporting a workpiece, and a turntable connected to the base for pivotal movement about a vertical axis. The turntable typically includes a workpiece support surface forming with the support surface of the base a smooth continuous upper surface and further includes a saw arm mounted on the turntable for movement with the turntable about the vertical axis. The turntable also includes a central opening, and a kerf plate is bolted onto the turntable in the central opening to provide additional support to the workpiece during cutting of the workpiece.

The saw arm is connected to the turntable for pivotal movement about a first horizontal axis between a raised position and a cutting position. In a compound miter saw, the saw arm is also connected to the turntable for movement about a second horizontal or bevel angle axis to allow the user of the saw to make angular bevel cuts in the workpiece. Movement of the saw arm between the non-cutting and cutting positions and about the bevel angle axis creates a moment force on the turntable about the vertical axis of the turntable. In order to provide adequate support for the workpiece, it is important that the turntable be stable during the cutting operation. Repetitive pivotal movement of the turntable about the vertical axis causes wear of the engaging surfaces between the base and the turntable. Wear can result in the development of a loose fit between the base and the turntable. The loose fit allows rocking movement of the turntable with respect to the base and in response to the moment force on the turntable. Rocking movement of the turntable reduces the accuracy and reliability of the miter saw.

SUMMARY OF THE INVENTION

The invention provides a cutting tool or miter saw including a base having a support surface for supporting a workpiece. A turntable is supported by the base for rotation about a generally vertical axis. The turntable includes a support surface which forms a smooth continuous workpiece supporting surface with the support surface of the base and the turntable has an aperture in the workpiece support surface. A cutting miter saw arm is supported by the turntable for pivotal movement with the turntable about the vertical axis and for pivotal movement about a first horizontal axis between a raised position and a cutting position and about a bevel angle axis to allow compound miter cutting of a workpiece. The base includes a recess for housing the turntable, and a circular bearing in the recess.

The circular bearing is mounted between the turntable and the base, has a generally horizontal support surface, and is mounted on the base to support the turntable on the base. The bearing also includes a bearing cage which houses a plurality of bearing elements. The provision of a bearing assembly between the bearing surfaces of the turntable and the base substantially eliminates the wear on the bearing surfaces and provides support to the turntable. Also, the provision of a bearing including a generally horizontal support which is spaced radially from the vertical axis provides greater stability against rocking movement of the turntable relative to the base.

The miter saw also includes a biasing means for biasing the turntable toward the base. The provision of a biasing mechanism to bias the turntable toward the base provides added stability to the turntable to maintain the smooth, uninterrupted and continuous upper surface formed by the respective support surfaces of the turntable and the base. The provision of a smooth continuous upper surface is necessary in order to precisely cut a workpiece at a desired position.

The miter saw also includes a kerf plate which is housed within and which covers the aperture in the turntable. The kerf plate includes one end having a guide member which extends into the guide slot on the turntable and an opposite end having a pair of snap-fit latch members extending into the snapfit recesses in the turntable. The snap-fit latch members are selectively engageable to allow quick and easy insertion and removal of the kerf plate from the turntable.

Other features and advantages of the invention will become apparent to those skilled in the art upon review of the following detailed description, claims and drawings.

BRIEF DESCRIPTION OF THE DRAWINGS

FIG. 7 is an exploded view of the arrangement for supporting the turntable on the base.

FIG. 8 is an enlarged perspective view of the kerf plate of the miter saw.

FIG. 9 is an enlarged cross-sectional view taken along line 9—9 in FIG. 1.

Figure 1:
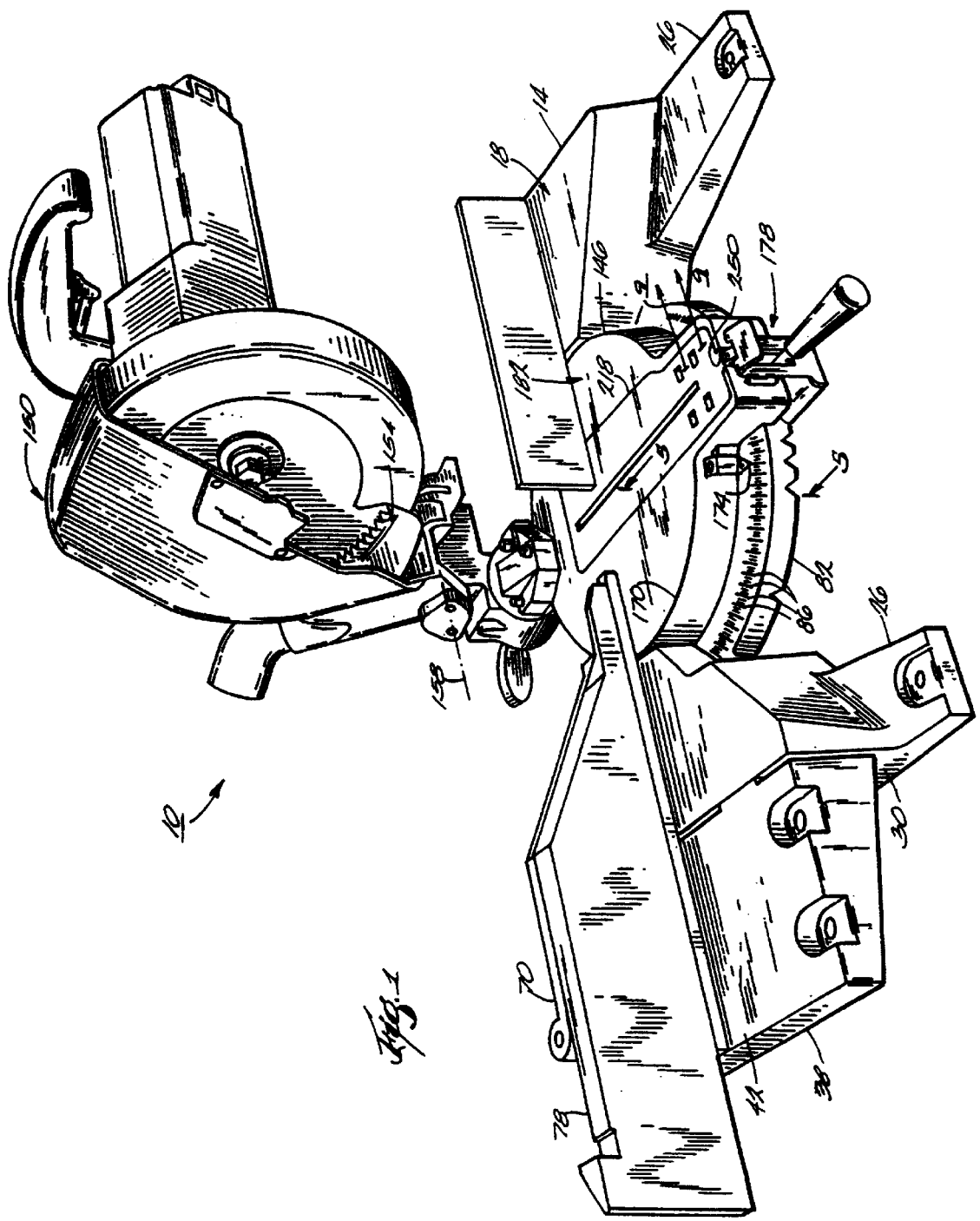
FIG. 1 is a perspective view of a miter saw embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE PREFERRED EMBODIMENT

Shown in FIG. 1 of the drawings is a miter saw or cutting tool 10 embodying the invention. The miter saw 10 includes a base 14 having a top surface 18, a bottom surface 22 (FIG. 5) and four feet 26 (only two of which are shown in FIG. 1) for supporting the base 14 on a surface (not shown). The base 14 also has a generally vertical end surface 30 (FIG. 1)

having therein a pair of threaded bores 34 (FIG. 7). As shown in FIG. 1, the miter saw 10 includes a base extension 38 having a workpiece support surface 42. A threaded bore (not shown) extends into the workpiece support surface 42 of the base extension 38. The base extension 38 has an end wall (not shown) and is connected to the end surface 30 of the base 14 by a pair of threaded bolts (not shown) extending through the end wall and into the bores 34 in the end surface 30 of the base 14.

The top surface 18 of the base 14 defines a horizontal workpiece support surface 58 (FIG. 7) having therein a pair of threaded bores 62 and 64 (FIG. 9) and a generally circular aperture 66 in the workpiece support surface 58. The workpiece support surface 42 of the base extension 38 and the workpiece support surface 58 of the base 14 form a smooth continuous surface to support a workpiece (now shown) during cutting of the workpiece. A fence support 70 (FIG. 1) is connected to the workpiece support surface 58 of the base 14 and to the workpiece support surface 42 of the base extension 38 by three bolts (now shown) which extend through the fence support 70 and into the bores (not shown) in the workpiece support surface 42 and into the bores 62 and 64 in the workpiece support surface 58. A fence 78 is connected to the fence support 70 to provide a vertical support surface for supporting the workpiece during cutting of the workpiece.

As shown in FIGS. 1 and 7, the base includes a periphery 82 and a plurality of markings 86 on the periphery 82. The purpose of the markings 86 is described in greater detail below.

As shown in FIG. 7, the base 14 includes a recessed generally horizontally extending support surface 90 in the aperture 66. The support surface 90 has therein a through-bore 94 communicating between the bottom surface 22 and the aperture 66 in the top surface 18 of the base 14 and has an annular bearing surface 98 which is spaced radially outwardly from and is centered about (i.e., is concentric with) the through-bore 94. The annular bearing surface 98 defines a plane perpendicular to the bore 94 and includes a continuous inner edge 102 (FIG. 5), and an annular rib 106 extends upwardly from the inner edge 102.

Figure 6:
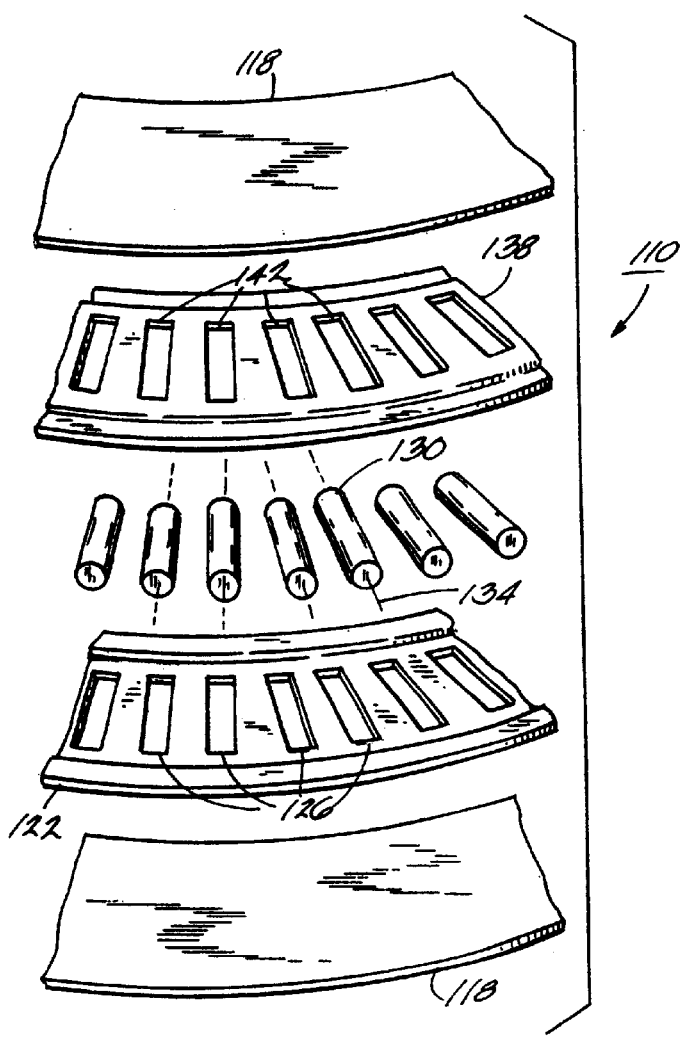
FIG. 6 is a partial exploded view of the bearing mechanism of the miter saw.

The miter saw 10 further includes a bearing 110 mounted on the annular bearing surface 98. The bearing 110 includes an annular bearing cage or housing 114 (FIG. 7) sandwiched between a pair of horizontally extending annular bearing races 118. The upper bearing race 118 includes a horizontal top surface 120. While the bearing cage 114 may be made from a single, generally planar annular member, the bearing cage 114 of the embodiment shown in FIG. 6 is a two piece housing including a lower cage portion 122 having therein a plurality of rectangular openings 126. An elongated cylindrical roller bearing or bearing element 130 having an axis 134 is mounted in each of the rectangular openings 126 in the lower housing portion 122 so that a portion of each roller bearing 130 extends through the respective opening 126. The axes 134 of the roller bearings 130 generally lie in the same horizontal plane. An upper bearing housing portion 138 having a plurality of rectangular openings 142 aligned with the cylindrical bearings 130 in the lower housing portion 122 is secured to the lower housing portion 122 to secure the cylindrical bearings 130 between the upper and lower housing portions 138 and 122, respectively, such that a portion of each bearing 130 also extends through the respective opening 142 in the upper housing portion 138. Each of the cylindrical bearings 130 is free to rotate about the respective bearing axis 134 within the bearing housing 114. Preferably, a lubricant (not shown) is applied to the bearings 130 to facilitate rotational movement of the bearings 130 within the bearing housing 114.

Figure 2:
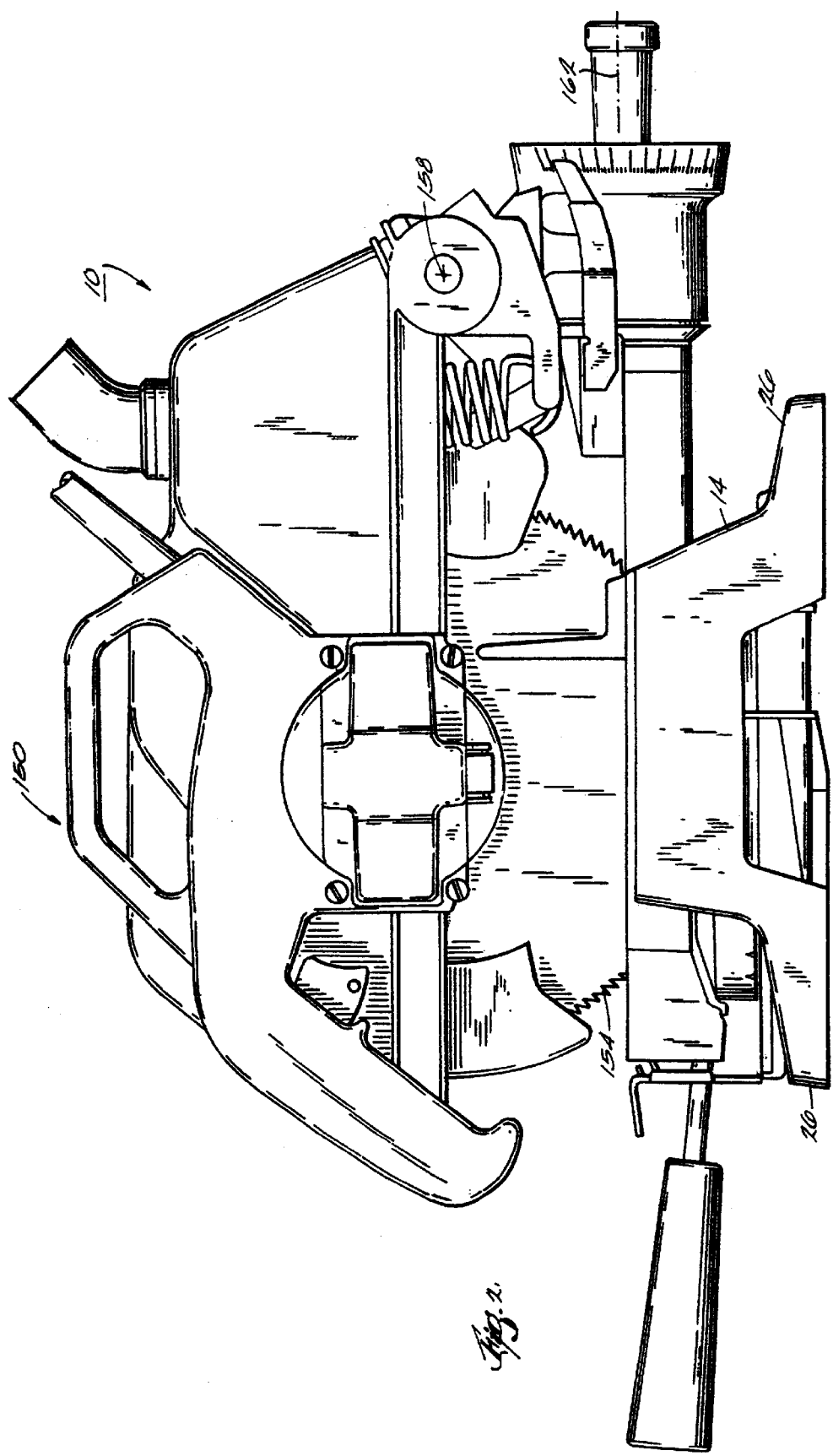
FIG. 2 is a right side elevational view of the miter saw showing the cutting unit in the cutting position.
Figure 3:
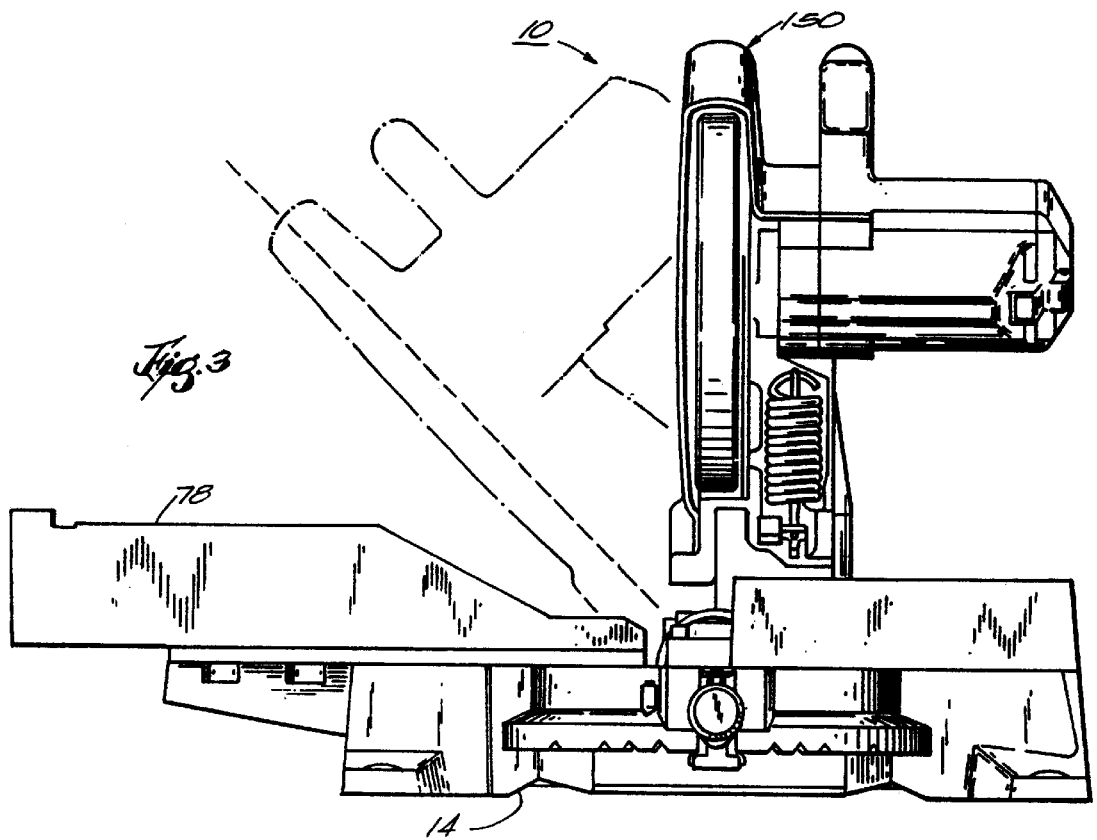
FIG. 3 is a front elevational view of the miter saw showing the cutting unit in the non-cutting position and, in phantom, showing the cutting unit adjusted to a 45° bevel angle position.
Figure 4:
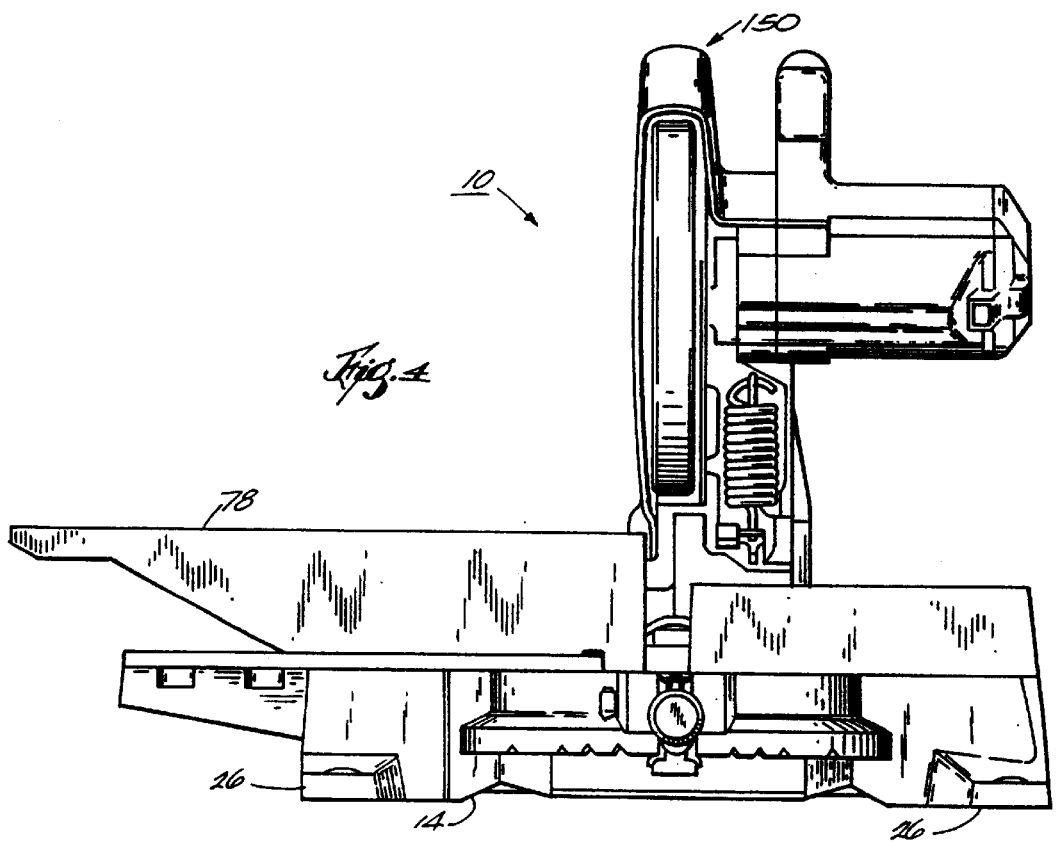
FIG. 4 is a front elevational view of the miter saw.

The miter saw 10 also includes a turntable 146 mounted in the aperture 66 of the base 14. A saw arm or cutting unit 150 having a saw blade 154 (FIGS. 1 and 2) is mounted on the turntable 146 for pivotal movement about a first horizontal axis 158 between cutting and non-cutting position (FIG. 2 and FIG. 1, respectively). While the invention is equally applicable to both conventional and compound miter cutting tools, the miter saw 10 illustrated in the drawings is a compound miter saw. Accordingly, the cutting unit 150 is also mounted on the turntable 146 for pivotal movement relative to a second horizontal or bevel angle axis 162 (FIG. 2) which is perpendicular to the first horizontal axis 158. Such movement is illustrated in phantom in FIG. 3.

The turntable 146 is connected to the base 14 for rotation about a vertical axis 166 to allow cutting of the workpiece at desired miter angles. The axis 166 is centered relative to the through-bore 94 in the base 14 and relative to the annular bearing housing 114. The turntable 146 includes a periphery 170 having mounted thereon a pointer 174. The pointer 174 indicates, in conjunction with the markings 86 on the periphery 82 of the base 14, the precise miter angle at which the cutting unit 150 and turntable 146 are adjusted relative to the base 14. The turntable 146 also includes a locking mechanism 178 mounted on the periphery 170 of the turntable 146 to secure the turntable 146 in any desired position relative to the base 14. The particular details of the locking mechanism 178 form no part of the invention and will not be described in greater detail.

The turntable 146 includes a workpiece support surface 182 forming a smooth continuous upper surface with the workpiece support surfaces 58 and 42 of the base 14 and base extension 38. The workpiece support surface 182 of the turntable 146 has therein an aperture 186 (FIG. 7) defined by a recessed surface 190 and a continuous sidewall 194 between the recessed surface 190 and the workpiece support surface 182 of the turntable 146. The recessed surface 190 has therein an aperture 198 extending through the turntable 146 to allow sufficient clearance for the saw blade 154 to extend below the workpiece support surface 182 of the turntable 146 when the cutting unit 150 is in the cutting position.

The recessed surface 190 of the aperture 186 includes a front end portion 202 adjacent the periphery 170 of the turntable 146. A pair of snap-fit recesses 206 are in the recessed surface 190 adjacent the front end portion 202. The aperture 186 also includes a rear end portion 210 adjacent the support for the cutting unit 150. The continuous sidewall 194 has therein an recess 214 adjacent the rear end portion 210.

Figure 5:
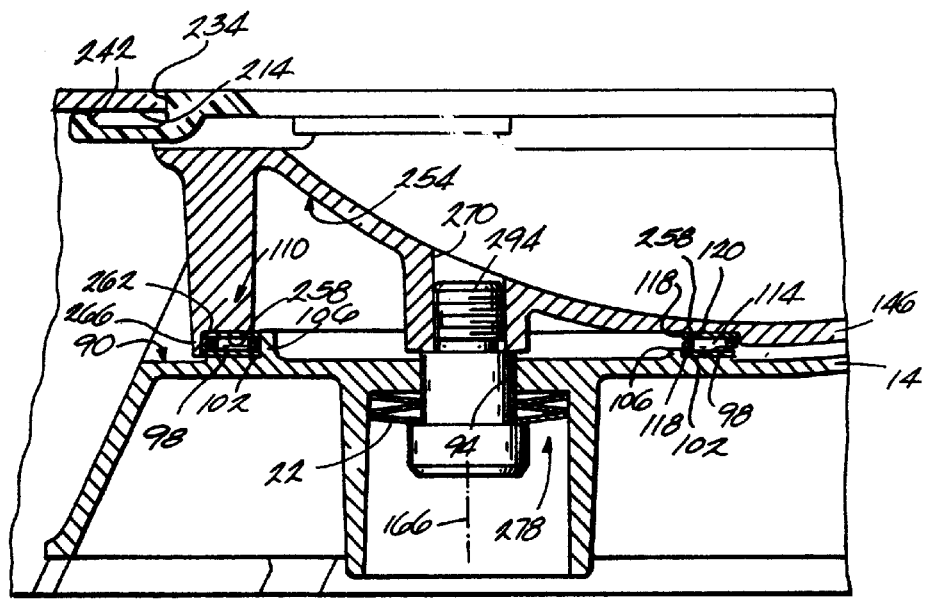
FIG. 5 is a cross-sectional view taken along line 5—5 in FIG. 1.

The miter saw 10 also includes a kerf plate 218 (FIGS. 7, 8, and 9) mounted in the aperture 186 of the turntable 146 to cover the aperture 186; to complete the smooth continuous upper surface provided by the workpiece support surfaces 182, 58, and 42 of the turntable 146, base 14, and base extension 38, respectively; and to provide support to the workpiece to prevent bottom chip-out of the workpiece during cutting of the workpiece. As best shown in FIGS. 7, 8 and 9, the kerf plate 218 includes an upper surface 222 (FIG. 7) and a lower surface 226 (FIG. 8). The lower surface 226 engages the recessed surface 190 of the aperture 186 in the workpiece support surface 182 of the turntable 146. A pair of snap-fit latches 230 (one of which is shown in cross-section in FIG. 9) each having two barbed latch members 232 depend from the lower surface 226 of the kerf plate 218 and, as shown in FIG. 9, extend into the snap-fit recesses 206 in the recessed surface 190 of the turntable 146 to secure the kerf plate 218 in place on the turntable 146. The kerf plate 218 also includes a rearward edge portion 234 and a forward edge portion 238. The rearward edge portion 234 includes a tab 242 which (as shown in FIG. 5) extends rearwardly into the recess 214 in the continuous sidewall 194 of the aperture 186 adjacent the rearward portion of the aperture 186. The forward edge portion 238 of the kerf plate 218 includes a guide tab 246 depending from the forward portion 238. The guide tab 246 extends into a recess 250 (FIG. 1) on the periphery 170 of the turntable 146 to provide additional stability to the kerf plate 218.

A completely new kerf plate 218 is substantially solid. However, when a new kerf plate 218 is installed for the first time on a turntable 146, the cutting unit 150 is switched on and lowered from the non-cutting position to the cutting position so that the rotating blade cuts through the saw kerf plate 218 to create a saw blade opening 252 (FIGS. 7 and 8) in the kerf plate 218. If the kerf plate 218 requires replacement, the snap-fit latches 230 can be quickly released manually with use of a tool such as a screwdriver, or other means thereby allowing a new kerf plate to be installed on the turntable 146.

The turntable 146 also includes a lower surface 254 (FIG. 5) defining an annular bearing surface 258 dimensioned to engage the annular bearing 110 mounted on the bearing surface 98 of the base 14. The bearing surface 258 of the turntable 146 has an outer edge 262 and a continuous annular lip 266 depending from the outer edge 262. The lip 266 of the turntable 146 and the rib 106 of the base 14 are dimensioned so as to capture the bearing mechanism 110 in a fixed radial position relative to the axis and operate to secure the turntable 146 in a fixed radial position relative to the base 14.

The turntable 146 rides on the horizontal top surface 120 of the bearing 110. The top surface 120 of the bearing 110 thus provides a smooth horizontal support surface spaced radially outwardly from the axis 166 to support the turntable 146 and prevent rocking of the turntable in response to the moment force caused by movement of the saw arm 150 about the axes 158 or 162.

The lower surface 254 of the turntable 146 has therein a threaded bore 270 aligned with the through-bore 94 in the base 14. A threaded bolt 274 extends from the bottom surface 22 of the base 14 through the through-bore 94 in the base 14 and into the threaded bore 270 in the turntable 146 to secure the turntable 146 to the base 14 for rotation about the vertical axis 166. The vertical axis 166 is colinear with the threaded bolt 274 securing the turntable 146 to the base 14 and the bolt 274 functions as a pivot pin for the turntable 146.

The miter saw 10 includes a biasing mechanism 278 connected between the bolt 274 and the bottom surface 22 of the base 14. The biasing mechanism 278 biases the turntable 146 toward the base 14 to provide stability to the turntable 146 as the turntable 146 pivots relative to the base 14. While various types, configurations and combinations of springs, such as helical, belleville, or others are appropriate to achieve the desired results, in the embodiment shown in FIGS. 5 and 7, the biasing mechanism 278 includes three concave, disk-shaped belleville springs 282, 286, and 290 mounted on the bolt 274 in parallel (i.e., the two lower-most springs 282 and 286 are positioned so that the outer edges of the springs engage one another and the third spring 290 is arranged on top of the second spring 286 so that the outer edge of the third spring 290 curves away from the outer edge of the second spring 286 and engages the bottom surface 22 of the base 14). The parallel arrangement of the springs 282, 286, and 290 provides sufficient biasing force to maintain the smooth continuous upper surface established by the workpiece support surface 182 of the turntable 146 and the workpiece support surface 58 of the base 14 regardless of the position of the cutting unit 150.

In operation, as the turntable 146 pivots about the vertical axis 166 and the cutting unit 150 is moved between the non-cutting and cutting positions, or the cutting unit 150 is adjusted about the horizontal bevel angle axis 162 for compound miter cutting, the biasing force of the biasing mechanism 278 holds the turntable 146 in position on the base 14 so that the continuous upper surface formed by the workpiece support surface 58 of the base 14 and the workpiece support surface 182 of the turntable 146 is not interrupted in response to the moment force placed on the turntable 146. The bearing 110 between the bearing surface 98 of the base 14 and the bearing surface 258 of the turntable 146 substantially prevents wear between the respective bearing surfaces 98 and 258, provides a broad horizontal top support surface 120 spaced from the axis 166 to support the turntable, and eliminates the development of a loose fit between the base 14 and the turntable 146 thereby improving the accuracy and reliability of the miter saw 10.

Various features of the invention are set forth in the following claims.

What is claimed is:

1. A cutting tool comprising:
   a base having a workpiece support surface for supporting thereon a workpiece, and having a first annular upwardly facing bearing surface;
   a turntable mounted on the base for rotation about a generally vertical axis, the turntable having a workpiece support surface and a second annular, downwardly facing bearing surface;
   a cutting unit mounted on the turntable for movement therewith; and
   a roller bearing mounted on the first annular upwardly facing bearing surface and for supporting the second annular, downwardly facing bearing surface, the roller bearing supporting the turntable for rotation about the vertical axis, the roller bearing including an annular, generally planar bearing cage having therein a series of openings, and a plurality of bearing elements mounted in the openings to support the turntable on the base.

2. A cutting tool as set forth in claim 1 wherein the cutting tool further includes biasing means for biasing the second bearing surface toward the first bearing surface so that the base workpiece support surface and the turntable workpiece support surface form a smooth continuous surface beneath the cutting unit.

3. A cutting tool as set forth in claim 2 wherein the biasing means includes a spring member connected between the base and the turntable.

4. A cutting tool as set forth in claim 2 and further including a threaded bolt securing the turntable to the base and wherein the biasing means includes a disk-shaped spring member connected between the bolt and the base to bias the turntable toward the base.

5. A cutting tool as set forth in claim 1 wherein the turntable workpiece support surface has therein an opening and wherein the cutting tool includes a snap-in kerf plate removably connected to the turntable and housed in the opening in the surface of the turntable to support the workpiece during cutting.

6. A cutting tool as set forth in claim 5, wherein said turntable includes latch receiving recesses, and wherein said kerf plate includes integrally formed latch members that are releasably received by said latch receiving recesses.

7. A cutting tool as set forth in claim 6, wherein said latch members extend from a periphery of said kerf plate, and wherein each of said latch members includes a barbed portion that engages the turntable.

8. The cutting tool as set forth in claim 1 further comprising a bearing race supported by said roller bearing and having a smooth top surface, wherein said second bearing surface has a smooth portion that engages said smooth top surface of said bearing race.

9. The cutting tool as set forth in claim 1, wherein said first bearing surface includes an annular rib, wherein said second bearing surface includes an annular lip, and wherein said bearing is captured between said rib and said lip.

10. A cutting tool as set forth in claim 1, wherein said bearing elements have horizontal axes extending radially with respect to the axis of rotation of the turntable.

11. A cutting tool comprising:
  a base having a workpiece support surface for supporting thereon a workpiece, and having a first annular upwardly facing bearing surface;
  a turntable mounted on the base for rotation about a generally vertical axis, the turntable having a workpiece support surface and a second annular, downwardly facing bearing surface;
  a cutting unit mounted on the turntable for movement therewith;
  a roller bearing mounted on the first annular upwardly facing bearing surface and for supporting the second annular, downwardly facing bearing surface; and
  a spring member connected between the base and the turntable for biasing the second bearing surface toward the first bearing surface so that the base workpiece support surface and the turntable workpiece support surface form a smooth continuous surface beneath the cutting unit.

12. A cutting tool as set forth in claim 11 and further comprising a threaded bolt securing the turntable to the base and wherein the spring member includes a disk-shaped spring connected between the bolt and the base to bias the turntable toward the base.

13. A cutting tool as set forth in claim 11 wherein the roller bearing includes an annular, generally planar bearing cage having therein a series of openings, and a plurality of bearing elements mounted in the openings to support the turntable on the base and prevent movement of the bearing elements relative to one another.

14. A cutting tool as set forth in claim 13 wherein the bearing elements have horizontal axes extending radially with respect to the axis of rotation of the turntable.

15. A cutting tool comprising:
  a base having a workpiece support surface for supporting thereon a workpiece, and having a first annular upwardly facing bearing surface;
  a turntable mounted on the base for rotation about a generally vertical axis, the turntable having a workpiece support surface and a second annular, downwardly facing bearing surface;
  a cutting unit mounted on the turntable for movement therewith; and
  a roller bearing mounted on the first annular upwardly facing bearing surface and supporting the second annular, downwardly facing bearing surface so that the turntable is supported for rotation about the vertical axis, the roller bearing including a plurality of generally cylindrical bearing elements having horizontal axes extending radially with respect to the axis of rotation of the turntable.

16. A cutting tool as set forth in claim 15 wherein the roller bearing includes an annular, generally planar bearing cage having therein a series of openings, and wherein the bearing elements are mounted in the openings to support the turntable on the base and prevent movement of the bearing elements relative to one another.

17. A cutting tool as set forth in claim 15 and further comprising biasing means biasing the second bearing surface toward the first bearing surface so that the base workpiece support surface and the turntable workpiece support surface form a smooth continuous surface beneath the cutting unit.

18. A cutting tool as set forth in claim 17 wherein the biasing means includes a spring member connected between the base and the turntable.

19. A cutting tool as set forth in claim 17 and further including a threaded bolt securing the turntable to the base and wherein the biasing means includes a disk-shaped spring member connected between the bolt and the base to bias the turntable toward the base.

* * * * *